United States Patent [19]

Chiu

[11] Patent Number: 5,606,348
[45] Date of Patent: Feb. 25, 1997

[54] PROGRAMMABLE DISPLAY INTERFACE DEVICE AND METHOD

[75] Inventor: Yue T. Chiu, Eatontown, N.J.

[73] Assignee: The United States of America as represented by the Secretary of the Army, Washington, D.C.

[21] Appl. No.: 372,405

[22] Filed: Jan. 13, 1995

[51] Int. Cl.$^6$ ........................................................ G09G 5/00
[52] U.S. Cl. .......................... 345/213; 345/185; 345/204; 395/521; 395/507; 395/556
[58] Field of Search ...................................... 345/213, 204, 345/205, 208, 214, 30, 185, 189; 395/162, 550; 348/571, 572, 552, 521, 500, 505, 516, 522, 536, 540, 547, 739

[56] References Cited

U.S. PATENT DOCUMENTS 4,926,166   5/1990   Fujisawa et al. ........................ 345/213
5,138,305   8/1992   Tomiyasn .................................. 345/213
5,153,574  10/1992   Kondo ........................................ 345/88

*Primary Examiner*—Kee M. Tung
*Attorney, Agent, or Firm*—Michael Zelenka; William H. Anderson

[57] ABSTRACT

A programmable display interface device and method is easily adapted to drive a variety of different display devices of different sizes and resolutions including CRT, LCD, EL, FED, and plasma displays. The interface device and method also allows such displays to be connected to and display images from different video and graphics sources such as cameras and computer outputs and allows the display of 3D stereo image data to any of the above mentioned displays in the format that is compatible with any of the time-multiplex, spatial-multiplex, and multiplexed multi-images methods used in producing 3D stereo effects. The interface device and method applies equally to color and monochrome displays.

23 Claims, 1 Drawing Sheet

PROGRAMMABLE DISPLAY INTERFACE DEVICE AND METHOD

GOVERNMENT INTEREST

The invention described herein may be manufactured, used, and licensed by or for the Government of the United States without the payment to me of any royalty thereon.

FIELD OF THE INVENTION invention relates in general to the field of display technology, or more particularly to display interfaces.

BACKGROUND OF THE INVENTION

There is a wide variety of video display systems which are known in the art for different applications. These include, CRT, EL, LCD, FED, plasma displays, and the like. Each type of display usually has its own set of input requirement in terms of the signal type (i.e. analog vs. digital), signal format (i.e. serial format, and the variety of parallel formats), and signal timing. In the case of a CRT, for example, it usually requires the input signals to be in analog, and in a serial fashion. The color CRT used in today's desktop computer (when it is operated in VGA mode) requires RGB (red, green, blue) data signals in analog and serial format. Similarly, the NTSC signal used in a home TV set, camera or VCR is also analog and serial, but different from the above in that the signal is composite (i.e. data, color, and synchronization all combined into one signal). For flat panel displays (i.e. EL, LCD, plasma, etc.), the inputs are usually digital and the format can be either serial or parallel depending on the manufacturer. In the parallel format, this can be in any number of bits (i.e 2-bit parallel, 4-bit parallel, and so on), as well as in a parallel fashion that is used in dual drive schemes (i.e. each column is divided into two halves with each driven separately by different data signals) on some of the newer displays. This uniqueness of display input requirements exists because there is no universal display standard interface exists to date. In addition, the video/graphics source that the display connects to may come in a variety of forms (i.e. NTSC, VGA, PAL, separate data with sync signal on green, etc.). As such, each display requires a specific display driver controller designed specifically for a particular input source and display type. Each is designed for only one type of application. In PC applications, although there are some graphics controllers that can drive both a CRT and a flat panel display, none can operate all/any of the above display types. Furthermore, in the case of flat panels, their resolutions are also very specific. A display with a specific resolution may not operate with a controller running at a different resolution mode (i.e. a 640×480 flat panel display will not work with a controller running at 1024×768). Heretofore there has been no available controller/adapter which allows a variety of input sources to be used interchangeable with a variety of display devices.

In the area of 3D stereo display applications, there are a variety of methods of generating 3D stereo images. The most common method is to emulate how the human eye sees 3D in real life. When we view an object, each of the eyes receives a perspective view of the object due to the fact that the eyes are separated by an inter-ocular distance. Each perspective view is distinct from the other, thus each eye sees a distinct view of the same scene. To emulate this effect in a display system, it involves basically the following two step process: 1) presenting the perspective image data to the display, and 2) directing or channeling these images to the proper eyes. The process of presenting the perspective image data to the display is what concerns this invention. The channeling of the image data to the two eyes is done with various methods using optics, polarizers, shutters, lenticular lenses, etc. However, depending on which method is used in directing and channeling the images to the two eyes, it affects the way the image data is to be presented to the display.

The method of directing and channeling the images dictates how the data is to be presented to the display. In a time multiplex method, the image data are presented to the display at different time intervals (i.e. displaying the right eye data at time $t_0$, followed by the left eye data at time $t_1$, followed by right eye data at time $t_2$, followed by left eye data at time $t_3$, and so on). It is during these time intervals that the optics/shutter system channels the different images to the different eyes. The spatial multiplex method involves presenting the perspective image data at different areas on the screen (i.e. right eye image data on odd columns and left eye image data on even columns on the display; or alternate rows can be used). In this method, lenticular lens or micropolarizer filters are the most common devices to use to direct the images to the eyes. The multiplexed multi-image method involves with using and therefore presenting more than one stereo image pairs to the display. This can be accomplished in a time-multiplex or spatial-multiplex fashion. Because of the wide variety of methods used in 3D display systems, each 3D system requires a unique driver controller to present the stereo image data to the display in a specific way in according with specific method used. Heretofore there has been no available adapter/controller which can be used interchangeable with a variety of 3D stereo display systems.

The invention provides a programmable, flexible display interface system which can provide the following functions: 1) the ability to adapt to drive a variety of different display devices of different sizes and resolutions including CRT, LCD, EL, FED, and plasma displays, 2) the ability to allow such displays to be connected to and display image from different video and graphics sources such as camera and computer outputs, and 3) the ability to allow the display of 3D stereo image data to any of the above mentioned displays in the format that is compatible with any of the time-multiplex, spatial-multiplex, and multiplexed multi-images methods used in producing 3D stereo effects. The above applies equally to color and monochrome displays.

SUMMARY OF THE INVENTION

The invention provides a programmable display interface which comprises a.) a memory capable of storing digital data;

b.) means for providing digital video or graphic data signals as an input to the memory through an optional analog to digital converter;

c.) a phase locked loop circuit;

d.) means for providing horizontal and vertical synchronization signals corresponding to the video or graphic data signals and providing said horizontal and vertical synchronization signals as inputs to the phase locked loop circuit;

e.) a first programmable oscillator which generates a first clock signal, having a predetermined frequency the same as that of the input video or graphic data signals as an input to the phase locked loop circuit; the phase locked loop circuit being capable of phase locking the first clock signal to the horizontal and vertical synchronization signals and generating an output clock signal having a frequency which is substantially the same as the frequency of the video or graphic data signals and having a phase which is substantially the same as the input horizontal and vertical synchronization signals and generating modified horizontal and modified vertical synchronization signals having a frequency which is substantially the same as the frequency of the input horizontal and vertical synchronization signals respectively;

f.) a programmable memory controller capable of controlling the input and storage of the digital video or graphic data signals in the memory responsive to clock, modified horizontal and modified vertical synchronization signals from the phase locked loop circuit, and the output of timing and synchronization signals to a programmable output formatter responsive to a predetermined clock frequency from a second clock signal generated by a second programmable oscillator; and g.) a programmable output formatter capable of receiving and formatting the digital video or graphic data signals in the memory responsive to inputs from the second clock signal generated by the second programmable oscillator and the timing and synchronization signals from the programmable memory controller and generating output signals comprising formatted data, clocking, timing and blanking signals suitable for operating a target data display.

The invention also provides a programmable display device which comprises the above described interface and a data display responsive to signals generated from the programmable output formatter.

The invention further provides a method of modifying video or graphics timing and control signals, as well as rearranging the signal data which are suitable for display corresponding to a first display format to video or graphic data signals which are suitable for display corresponding to a second display format, which method comprises:

a.) providing digital video or graphic data signals as an input to a memory capable of storing digital data;

b.) providing horizontal and vertical synchronization signals corresponding to the video or graphic data signals and providing said horizontal and vertical synchronization signals as inputs to a phase locked loop circuit;

c.) generating a first clock signal, having a predetermined frequency the same as that of the input video or graphic data signals, as an input to the phase locked loop circuit and causing the phase locked loop circuit to phase lock the first clock signal to the horizontal and vertical synchronization signals and to generate an output clock signal having a frequency which is substantially the same as the frequency of the video or graphic data signals and having a phase which is substantially the same as the input horizontal and vertical synchronization signals and generating modified horizontal and modified vertical synchronization signals having a frequency which is substantially the same as the frequency of the input horizontal and vertical synchronization signals respectively;

d.) inputting the clock, modified horizontal and modified vertical synchronization signals from the phase locked loop to a programmable memory controller which controls the input and storage of the digital video or graphic data signals in the memory responsive to said signals, which programmable memory controller outputs timing and synchronization signals to a programmable output formatter responsive to a predetermined clock frequency from a second clock signal generated by a second programmable oscillator; and e.) providing the stored digital video or graphic data signals in the memory as an output to a programmable output formatter and formatting the such digital video or graphic data signals responsive to inputs from the second clock signal generated by the second programmable oscillator and the timing and synchronization signals from the programmable memory controller and generating output signals comprising formatted data, clocking, timing and blanking signals suitable for operating a data display corresponding to a second target display format.

By using the programmable oscillators, phase-locked-loop (PLL), A/D converter, programmable memory controller, memory, and the programmable output formatter, an effective adaptive display interface (ADI) is provided. The objectives of the ADI are to provide the ability to 1) adapt to drive a variety of different display devices of different sizes and resolutions including CRT, LCD, EL, FED, and plasma displays, 2) allow such displays to be connected to and display image from different video and graphics sources such as camera and computer outputs, and 3) allow the display of 3D stereo image data to any of the above mentioned displays in the format that is compatible with any of the time-multiplex, spatial-multiplex, and multiplexed multi-images methods used in producing 3D stereo effects. The above applies equally to color and monochrome displays.

BRIEF DESCRIPTION OF THE DRAWINGS

These and other objects, features, and details of the invention will become apparent in light of the ensuing detailed disclosure, and particularly in light of the drawings wherein.

DETAILED DESCRIPTION

Figure 1:
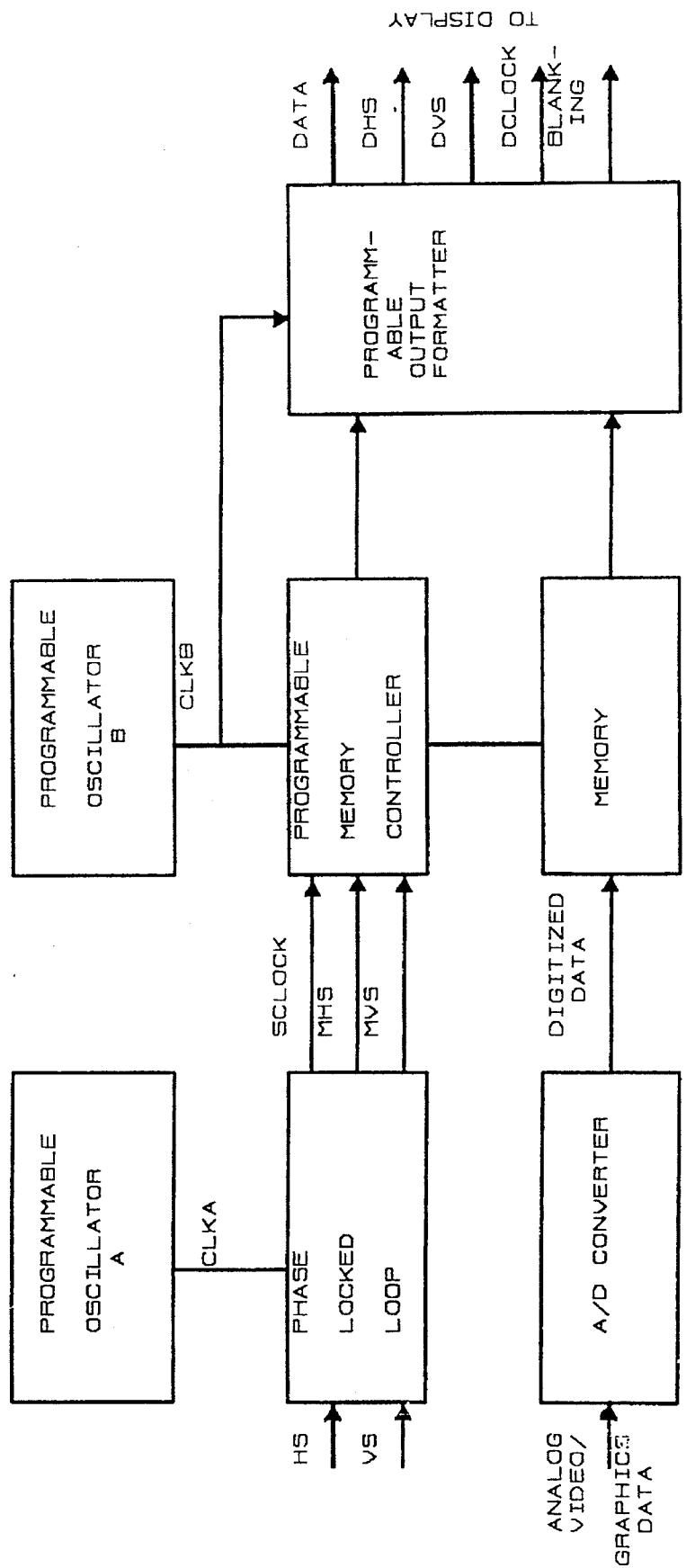
FIG. 1 shows a schematic representation of the adaptable display interface (ADI) system of the invention including phase locked loop, analog-to-digital (A/D) converter, memory, programmable oscillators, programmable memory controller, and programmable output formatter members.

The adaptable display interface (ADI) of this invention provides an interface system having the programmable, adaptive ability to reconfigure and adapt to the different input source and output display configuration requirements including 3D stereo display applications. The ADI operates by digitizing and storing video or graphics input data and uses programmable devices to generate timing and reformatted data signals for different display types and to reformat data for other applications including stereo and three dimensional applications.

FIG. 1 shows a schematic representation of the adaptable display interface of the invention. It allows any of a variety of display devices such as CRT, LCD, EL, FED, plasma, and the like to display images from any of a variety of video or graphics sources such as a camera, computer or the like. It may also be employed to reformat video data to display time-multiplexed, spatial multiplexed, and multiplexed multi-image 3D stereo images on any display device. In the embodiment described below, video or graphics data are digitized and stored and programmable devices reformat the data and timing signals so that they can interface to different display devices and to meet their different input requirements.

As shown in FIG. 1, data from any video or graphics source, for example a camera or computer, is first fed into an analog-to-digital (A/D) converter which outputs a digitized version of the data, i.e. data represented by 1's and 0's. The conversion rate is a function of the signal's resolution. The number of bits in an A/D converter is a function of the required number of color shades. The relationship is $2^n$= number of shades where n= the number of bits required. For example, a 256 shade image would require 8 bits. Three A/D converters would be needed for each of the red, green and blue signals in a color display. The required speed of the A/D is a function of the data signal bandwidth. The A/D converter is itself well known in the art. One suitable A/D converter is available from Analog Devices as model numbers AD9058, AD9002 or AD9038. This section can be bypassed if the data is already in digital form.

Horizontal (HS) and vertical (VS) synchronization signals associated with the video or graphic signals are fed to a phase locked loop circuit. A programmable oscillator generates a clock signal (clkA). The function of programmable oscillator A is to provide a clock signal (clkA) for the input data. The phase locked loop serves to put the clock signal from programmable oscillator A into synchronization with the input signals. The phase locked loop may be purchased from Cornes USA Ltd. as model number KS6369 (Glisten Gate). The programmable oscillators may be purchased from Fox Electronics as model F6053A. A combination phase locked loop and programmable oscillator may be purchased commercially from Integrated Circuit Systems as model number ICS1522. The incoming horizontal (HS) and vertical (VS) synchronization signals are phase locked to (i.e. put into synchronization with) clock signal clkA by the phase locked loop circuit. The frequency of the oscillator or clock signal is programmed to be the same as that of the input video or graphics. Depending on the resolution of the input data, each pixel or picture element, or dot in a CRT comprises one clock cycle. The frequency of the clock signal can range from a few Mhz to over 100 MHz. For video or graphics signals at 1280×1024 resolution, the required conversion speed can be over 100 MHz. For signals without separate HS and VS signals such as NTSC video, HS and VS can be extracted with a simple circuit. The resultant outputs from the phase locked loop are modified HS and VS signals, which are designated MHS and MVS respectively, and a clock signal SCLOCK. In most cases, very little modification is performed on the HS and VS. When modification is performed, it is mostly polarity inversion. This is required to allow the memory controller to have a consistent signal to operate on, as these signals vary widely depending on the video/graphics source and their mode of operation. This is needed by the A/D converter so that it knows exactly when to start and stop digitizing the data relative to the input as well as by the memory controller so that it knows exactly when data is ready to be written into memory. These signals are used as timing signals by the programmable memory controller which serves to control the storage of digitized data in proper place in memory. The programmable oscillator B provides the clock signal for the memory controller to read data out from the memory to the output formatter as well as clock signal to the output formatter to generate the required timing signals for the targeted display. Its clock rate depends on the targeted display input requirements which in turn are a function of resolution, display refresh rate, etc.

The memory serves to store the digitized data. The amount of memory required is mainly a function of the image resolution and number of color required. A memory of 24 planes deep is required for an 8-bit R,G,B system. The way data are stored in the memory is a function of the targeted display requirement, as well as the application (i.e. 3D vs. non-3D). For CRT non-3D application, data are usually stored a frame at a time, and read out serially. For flat panel displays, data have to be stored in such a way that they can be read out in a parallel fashion as required by the targeted display, this includes the simultaneously reading out of data for the top and bottom halves of a frame as required by displays using dual drive schemes. For 3D applications, the data can be stored a field at a time, a frame at a time, a frame with alternate column or row containing the two stereo image pair data, etc. so that the data can be read out in such a way that is compatible with any of the time-multiplex, spatial-multiplex, and multiplexed multi-images methods used in producing 3D stereo effects. The memory's output data rate is independent, i.e. asynchronous, of its input data rate. This allows the refresh rate DVS to the display to be asynchronous with the input rate so that higher refresh rate can be obtained for display requiring higher refresh rate for higher brightness, time-multiplex 3D displays requiring higher rate to reduce flickers; as well as the ability to perform interlaced or progressive scanning. Any commercially available video memory chip VRAMs are suitable for the task, examples are TMS55160 from Texas Instruments or UPD482444 from NEC. The programmable memory controller functions to assure that the data are properly written into and read from the intended location in memory, as well as to keep and maintain the data once they are stored in memory. It provides all control signals for the read, write, refresh and transfer cycles for the memory. The memory controller is programmable because it must be able to adapt to the different output formats, resolutions, refresh rate, scan methods, etc. of the various display and application requirements as mentioned above. Any of the commercially available EPAL (erasable programmable array logic) or FPGA (field programmable gate array) are suitable for the task, examples are 5000, 7000, 8000 series EPAL from Altera, and the 3000 and 4000 series chips from Xilinx. When data are read out from the memory, they go to the programmable output formatter. Here the data are put into a final format that is required by the targeted display and/or the intended application. For display requiring analog signals, the digitized data from the memory have to be converted to analog form using digital-to-analog (D/A) converter. D/A converters are commonly available commercial item. Examples of some of the suitable D/A are AD9712, AD9720 from Analog Devices and BT121 from Brooktree. Other signals generated from the output formatter are the timing and control signals DHS, DVS, DCLOCK, blanking, etc. that are required by the targeted display. These signals are all synchronized with each other, but may or may not be synchronized to those of the inputs from the source. Similar EPAL or FPGA used in memory controller can be used for the output formatter, as these are programmable devices which can be programmed to perform any logic or control functions.

Because of the programmability of the ADI, it can provide the following wide range of applications: 1) it can be adapted to drive a variety of different display devices of different sizes and resolutions including CRT, LCD, EL, FED, and plasma displays, 2) it can allows such displays to be connected to and display images from different video and graphics sources such as camera and computer outputs, 3) it allows the display of 3D stereo image data to any of the above mentioned displays in the format that is compatible with any of the time-multiplex, spatial-multiplex, and multiplexed multi-images methods used in producing 3D stereo effects.

To illustrate the usefulness of the ADI, one may consider a stereo camera operating in a time-multiplexed fashion with its output containing the perspective left and right image data in alternate fields which is used as a source to provide 3D image data to a flat panel display system using the spatial multiplex method where the perspective image data are to be presented in alternate rows. Without the ADI this can be a major design effort as one has to deal with the combination of 1) the none-standard flat panel interface, and 2) the complexity of dealing with 2 different methods of 3D implementation. With the ADI this can be accomplished easily. First the data signal (assuming that it is in a common analog NTSC format) is digitized with the A/D converter. Second, by programming the memory controller, the data are stored 2 fields at a time into the memory with the right image data going to location A and left image data to location B. The data in memory can then be read out (again by control of the memory controller) in a fashion that is called for by the required spatial-multiplex method, that is odd row data from location A and even row from location B. The output formatter is then programmed to provide the data format as required by the targeted flat panel display, along with the required timing and control signals, DHS, HVS, DCLOCK, blanking, etc.

What is claimed is:

1. A programmable display interface which comprises
   a.) a memory for storing digital data;
   b.) means for providing digital video or graphic data signals as an input to the memory through an optional analog to digital converter;
   c.) a phase locked loop circuit;
   d.) means for providing horizontal and vertical synchronization signals corresponding to the video or graphic data signals and providing said horizontal and vertical synchronization signals as inputs to the phase locked loop circuit;
   e.) a first programmable oscillator which generates a first clock signal, having a predetermined frequency the same as that of the input video or graphic data signals as an input to the phase locked loop circuit; the phase locked loop circuit being for phase locking the first clock signal to the horizontal and vertical synchronization signals and generating an output clock signal having a frequency which is substantially the same as the frequency of the video or graphic data signals and having a phase which is substantially the same as the input horizontal and vertical synchronization signals and generating modified horizontal and modified vertical synchronization signals having a frequency which is substantially the same as the frequency of the input horizontal and vertical synchronization signals respectively;
   f.) a programmable memory controller for controlling the input and storage of the digital video or graphic data signals in the memory responsive to clock, modified horizontal and modified vertical synchronization signals from the phase locked loop circuit, and the output of timing and synchronization signals to a programmable output formatter responsive to a predetermined clock frequency from a second clock signal generated by a second programmable oscillator; and
   g.) a programmable output formatter for receiving and formatting the digital video or graphic data signals in the memory responsive to inputs from the second clock signal generated by the second programmable oscillator and the timing and synchronization signals from the programmable memory controller and generating output signals comprising formatted data, clocking, timing and blanking signals suitable for operating a target data display.

2. The programmable display interface of claim 1 wherein the formatted data, timing and blanking signals are suitable for operating one or more data displays selected from the group consisting of CRT, LCD, EL, FED and plasma displays.

3. The programmable display interface of claim 1 wherein the means for providing digital video input signals comprises an analog to digital converter.

4. The programmable display interface of claim 1 wherein the output from the memory has a data rate which is independent of its input data rate.

5. The programmable display interface of claim 1 wherein the data in the memory is arranged in an array format selected from the group consisting of a frame at a time, a field at a time, and a frame with alternate columns or rows.

6. The programmable display interface of claim 1 wherein the memory controller and programmable output formatter format the data signals as time multiplexed, spatial multiplexed, multiplexed multi-image three dimensional data display signals.

7. The programmable display interface of claim 1 wherein the programmable output formatter formats data signals having a different resolution from the data signals input to the memory.

8. The programmable display interface of claim 1 wherein the timing and control signals from the output of the programmable output formatter have a frequency and phase which are independent of their inputs.

9. The programmable display interface of claim 1 wherein the display clock signal from the output of the programmable output formatter is synchronous with those of the output display data, timing and control signals.

10. A programmable display device which comprises
   a.) a memory for storing digital data;
   b.) means for providing digital video or graphic data signals as an input to the memory through an optional analog to digital converter;
   c.) a phase locked loop circuit;
   d.) means for providing horizontal and vertical synchronization signals corresponding to the video or graphic data signals and providing said horizontal and vertical synchronization signals as inputs to the phase locked loop circuit;
   e.) a first programmable oscillator which generates a first clock signal, having a predetermined frequency the same as that of the input video or graphic data signals as an input to the phase locked loop circuit; the phase locked loop circuit the phase of locking the first clock signal to the horizontal and vertical synchronization signals and generating an output clock signal having a frequency which is substantially the same as the frequency of the video or graphic data signals and having a phase which is substantially the same as the input horizontal and vertical synchronization signals and generating modified horizontal and modified vertical synchronization signals having a frequency which is substantially the same as the frequency of the input horizontal and vertical synchronization signals respectively;

f.) a programmable memory controller for controlling the input and storage of the digital video or graphic data signals in the memory responsive to clock, modified horizontal and modified vertical synchronization signals from the phase locked loop circuit, and the output of timing and synchronization signals to a programmable output formatter responsive to a predetermined clock frequency from a second clock signal generated by a second programmable oscillator; and g.) a programmable output formatter for receiving and formatting the digital video or graphic data signals in the memory responsive to inputs from the second clock signal generated by the second programmable oscillator and the timing and synchronization signals from the programmable memory controller and generating output signals comprising formatted data, clocking, timing and blanking signals suitable for operating a target data display; and h.) a data display responsive to signals generated from the programmable output formatter.

11. The programmable display device of claim 10 wherein the data displays is selected from the group consisting of a CRT, an LCD, and ELS and plasma displays.

12. The programmable display device of claim 10 wherein the means for providing digital video input signals comprises an analog to digital converter.

13. The programmable display device of claim 10 wherein the output from the memory has a data rate which is independent of its input data rate.

14. The programmable display device of claim 10 wherein the data in the memory is arranged in an array format selected from the group consisting of a frame at a time, a field at a time, and a frame with alternate columns or rows.

15. The programmable display device of claim 10 wherein the output formatter formats the data signals as time multiplexed, spatial multiplexed, multiplexed multi-image, or three dimensional data display signals.

16. The programmable display device of claim 10 wherein the output formatter formats data signals having a different resolution from the data signals input to the memory.

17. A method of modifying video or graphic data signals which are suitable for display corresponding to a first display format to video or graphic data signals which are suitable for display corresponding to a second display format, which method comprises:

a.) providing digital video or graphic data signals as an input to a memory for storing digital data;

b.) providing horizontal and vertical synchronization signals corresponding to the video or graphic data signals and providing said horizontal and vertical synchronization signals as inputs to a phase locked loop circuit;

c.) generating a first clock signal, having a predetermined frequency the same as that of the input video or graphic data signals, as an input to the phase locked loop circuit and causing the phase locked loop circuit to phase lock the first clock signal to the horizontal and vertical synchronization signals and to generate an output clock signal having a frequency which is substantially the same as the frequency of the video or graphic data signals and having a phase which is substantially the same as the input horizontal and vertical synchronization signals and generating modified horizontal and modified vertical synchronization signals having a frequency which is substantially the same as the frequency of the input horizontal and vertical synchronization signals respectively;

d.) inputting the clock, modified horizontal and modified vertical synchronization signals from the phase locked loop to a programmable memory controller which controls the input and storage of the digital video or graphic data signals in the memory responsive to said signals, which programmable memory controller outputs timing and synchronization signals to a programmable output formatter responsive to a predetermined clock frequency from a second clock signal generated by a second programmable oscillator; and e.) providing the stored digital video or graphic data signals in the memory as an output to a programmable output formatter and formatting the such digital video or graphic data signals responsive to inputs from the second clock signal generated by the second programmable oscillator and the timing and synchronization signals from the programmable memory controller and generating output signals comprising formatted data, clocking, timing and blanking signals suitable for operating a data display corresponding to a second target display format.

18. The method of claim 17 wherein the step of providing digital video or graphic data signals as an input to a memory is conducted with an analog to digital converter.

19. The method of claim 17 wherein the stored digital video or graphic data signals in the memory are provided as an output to the programmable output formatter at a rate which is independent of the data signal input rate to the memory.

20. The method of claim 17 comprising the step of arranging the data in the memory in an array format selected from the group consisting of a frame at a time, a field at a time, and a frame with alternate columns or rows.

21. The method of claim 17 wherein the formatted data, timing and blanking signals suitable for operating a data display correspond to a data display selected from the group consisting of CRT, LCD, EL, FED and plasma displays.

22. The method of claim 17 wherein the formatted data signals are time multiplexed, spatial multiplexed, multiplexed multi-image three dimensional data display signals.

23. The method of claim 17 wherein the formatted data signals have a different resolution from the data signals input to the memory.

* * * * *